United States Patent [19]

Witten

[11] Patent Number: 4,518,188
[45] Date of Patent: May 21, 1985

[54] AERODYNAMIC SIDE PANELS FOR A TRACTOR-TRAILER TRUCK

[76] Inventor: Hans J. Witten, 9201 Half-League Dr., Huntington Beach, Calif. 92646

[21] Appl. No.: 387,763

[22] Filed: Jun. 14, 1982

[51] Int. Cl.³ .............................................. B62D 35/00
[52] U.S. Cl. ...................................... 296/1 S; 296/91; 105/2 R
[58] Field of Search .................. 296/1 S, 91; 180/903; 52/64; 160/368 R; 14/71.5; 105/2 R, 8 R, 15

[56] References Cited

U.S. PATENT DOCUMENTS

| | | | |
|---|---|---|---|
| 2,195,247 | 3/1940 | Hendrickson | 105/15 |
| 2,793,597 | 5/1957 | Walters | 105/8 R |
| 3,834,752 | 10/1974 | Cook et al. | 180/903 |
| 4,036,519 | 7/1977 | Servais et al. | 296/1 S |
| 4,142,755 | 3/1979 | Keedy | 296/91 X |
| 4,311,334 | 1/1982 | Jenkins | 296/1 S |
| 4,343,505 | 8/1982 | Levassor | 296/1 S |

Primary Examiner—Robert B. Reeves
Assistant Examiner—Russell D. Stormer
Attorney, Agent, or Firm—Knobbe, Martens, Olson & Bear

[57] ABSTRACT

An airflow improvement device for improving aerodynamic characteristics of a tractor-trailer truck comprises a side panel extending between the side of the tractor and the side of the trailer. A first end of the side panel is fixed to one of the tractor or trailer and the other end of the side panel is slidably restrained in a pocket structure mounted to the other of the tractor or the trailer so that the side panel will bend to form a smooth curved transition surface between the sides of the tractor and the trailer when the truck articulates to make a turn.

3 Claims, 18 Drawing Figures

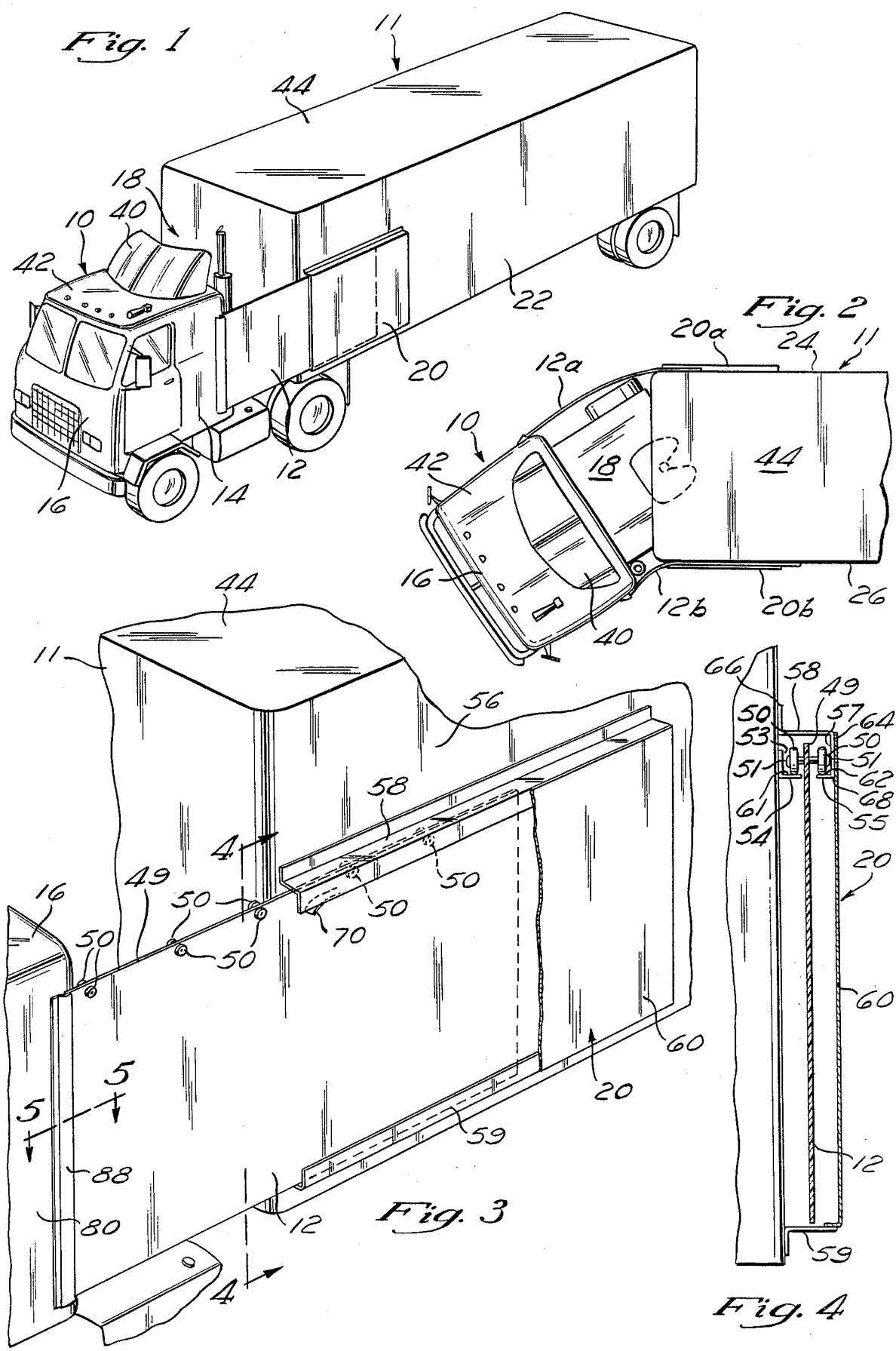

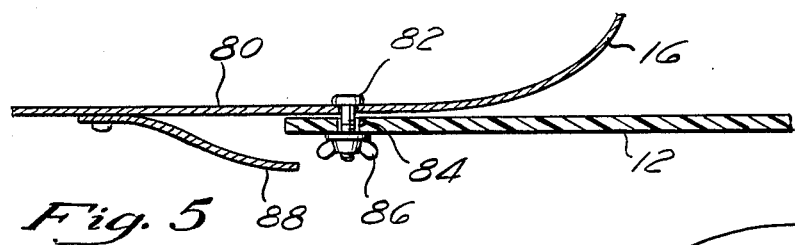
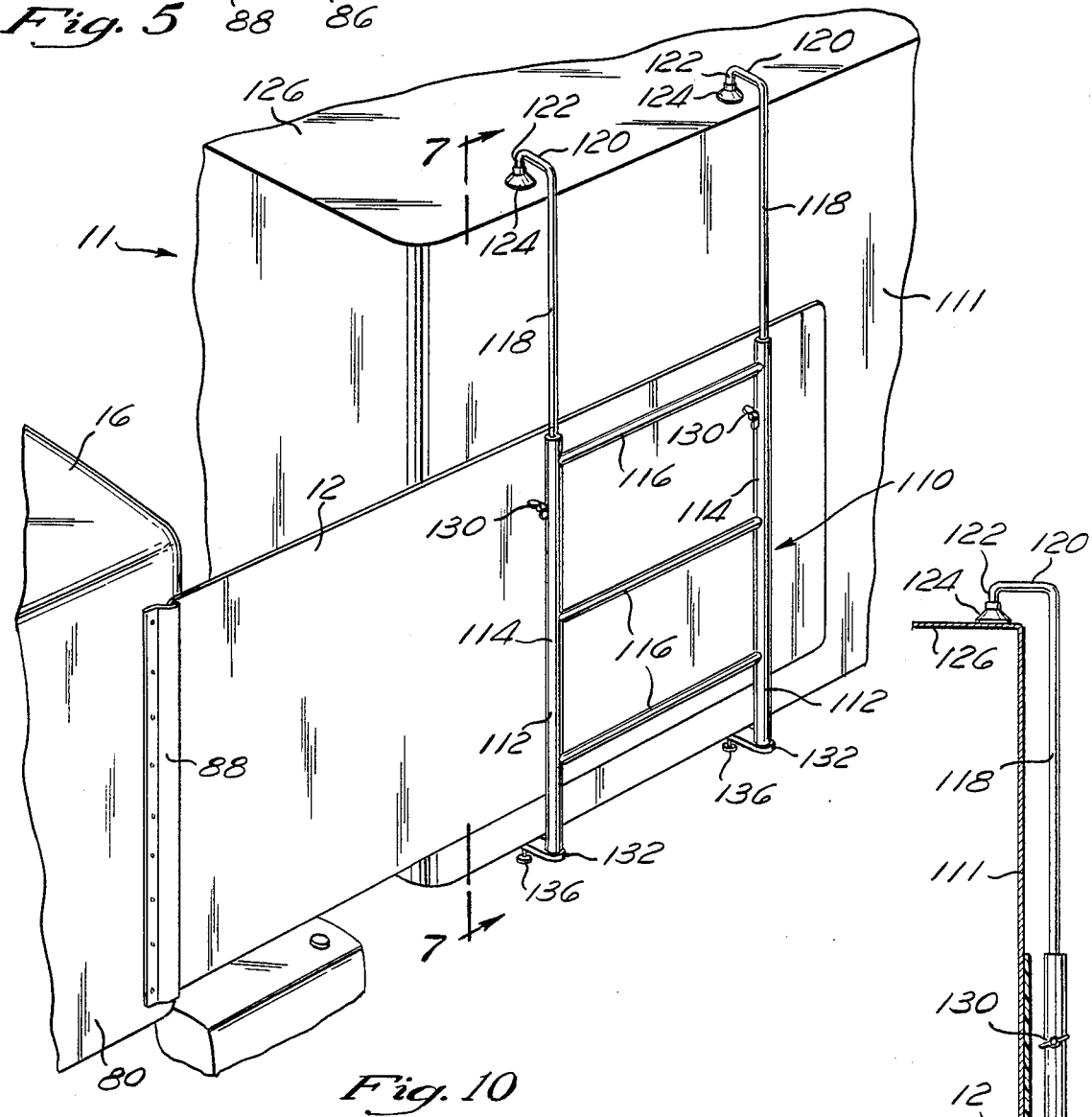
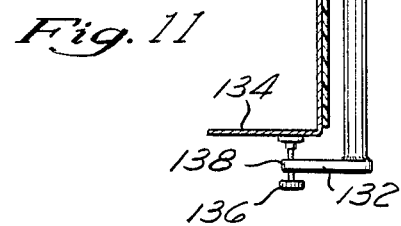

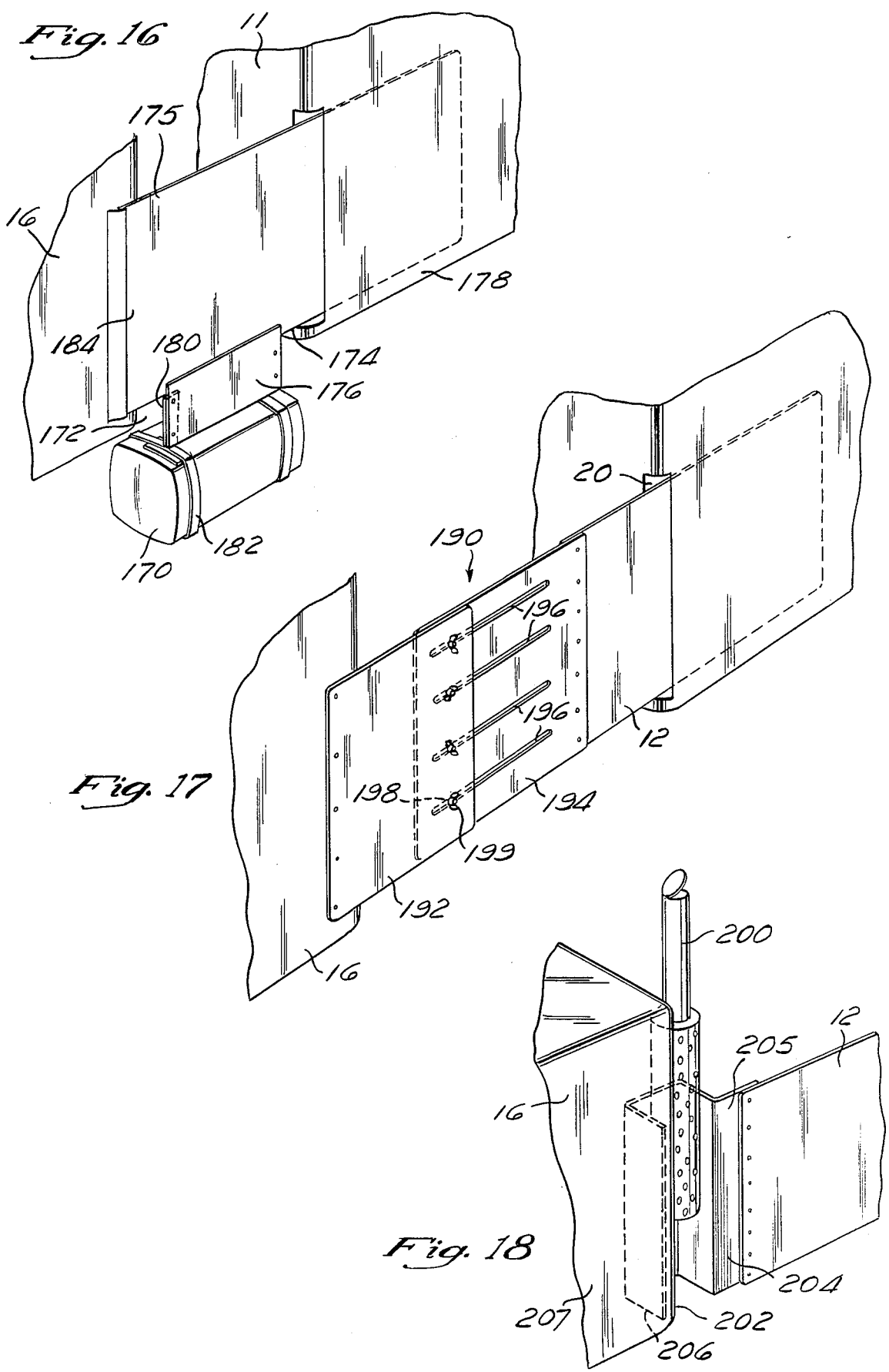

AERODYNAMIC SIDE PANELS FOR A TRACTOR-TRAILER TRUCK

BACKGROUND OF THE INVENTION

In recent times, conservation of energy has become a paramount concern due to a reduced availability and consequently a high cost of fuel. Conservation measures are particularly needed in the trucking industry.

Modern long-haul trucks are almost universally a tractor and semi-trailer type. In order to obtain as large a volume of load space as possible under regulations limiting a truck's length and width, their design has evolved into a generally rectangular configuration having a large flat-faced frontal area. The front of the tractor cab comprises only a portion of the frontal area, with the remaining frontal area made up of the front surface of the trailer exposed outwardly of the tractor cab. Most tractor-trailer trucks have a large separation between the tractor cab and the front of the trailer which is necessary to allow for movement of the trailer behind the cab during a turn. The large frontal area of the truck and the void space between the tractor and the trailer cause a large wind drag on the truck at highway speeds due to the poor airflow characteristics around the truck's shape. This requires more power to drive the truck and results in substantially increased fuel usage.

Many modifications and accessories have been developed to improve the streamline of the air flow around a combined tractor-trailer truck. Roof-mounted fairings have become popular which generally consist of a curvilinear deflector mounted to the roof of a tractor cab to direct airflow upwardly and over the roof of the trailer rather than allowing air to flow against the exposed upper portion of the forward face of the trailer causing substantial drag.

Additional designs have provided side skirts which are extended between the side of the tractor cab and the side of the trailer to provide a smooth transition surface therebetween. The side skirts streamline airflow past the void space between the tractor and trailer by eliminating turbulence which increases drag on the truck.

Specifically, this invention relates to flexible side panels which extend between a tractor and the trailer which it pulls, to provide improved aerodynamic airflow characteristics.

Exemplarly of prior designs which comprise a roof-mounted fairing and side skirts attached between a tractor and a trailer, is the air flow device disclosed in English Pat. No. 1,532,283, issued to Vauxhall Motors Limited. Side curtains or skirts described therein comprise rectangular sheets of flexible material which are wound around spring-biased rollers mounted to the cab. The material extends rearwardly from the roller for attachment to the side of the trailer to provide a smooth transition surface. The excess material wound on the roller provides let-out and take-up of side curtain material necessary during a turning maneuver of the tractor-trailer truck.

U.S. Pat. No. 4,142,755 of Keedy shows deflector shields extending between the top and sides of a tractor and a trailer to similarly provide a continuous side surface. The deflectors are made of a rigid material and are mounted to a rearward portion of the tractor cab by a hinge for articulating movement. The hinge is spring-biased to maintain sliding contact of the rearward ends of the deflectors with the outer surface of the trailer.

A French patent of Levassor shows a flexible canopy which is attached to the rearward profile of a tow vehicle and which extends rearwardly to conform to the profile of a trailer. The canopy forms a continuous interposing surface. The canopy is held in sliding contact with the trailer surface by springs coupled between the canopy and the periphery of the trailer.

U.S. Pat. No. 4,036,519 of Survais et al describes a shaped inflatable bag positioned between a tractor and a trailer which forms a contoured surface therebetween to improve aerodynamic characteristics. Similarly, the patent of Jenkins, U.S. Pat. No. 4,311,334 and of Cook et al, U.S. Pat. No. 3,834,752 disclose a deflector made of fabric-like material extended between the side surfaces of a tractor and a trailer. The fabric is formed into a bellows-like configuration to provide extensibility which is necessary when the truck makes a turn.

Each of the above cited devices, though providing improvements in the art, have failed to adequately provide an aerodynamic side panel structure which, when combined with a roof-mounted deflector, presents a durable and easy to use apparatus for accomplishing airflow improvement around a tractor-trailer truck. Most approaches disclosed in the prior art comprise fabric materials which are easily damaged in use, have little rigidity to resist deflection, and are difficult to handle for installation. It is often necessary to attach the fabric material to both the tractor cab and the trailer periphery to mount the deflector. This may require that the deflector be made in a custom configuration to fit the application. Other devices have compensated by using very rigid side panels which are difficult to maintain in position and awkward to handle. Some designs require cumbersome tensioning means to maintain the skirt or deflector in position. Many designs have complicated folded patterns or constructions.

SUMMARY OF THE INVENTION

Applicant's invention overcomes the afore-mentioned inadequacies by providing a pair of resilient semi-flexible side panels for a tractor-trailer truck which extend between the side surface of the cab and the trailer to improve their airflow dynamics when traveling at high speeds and reduce drag. The panels are sufficiently rigid to be substantially self-supporting from an attachment to the tractor cab, while retaining sufficient flexibility to bend when the tractor-trailer maneuvers through a turn. The trailing portion of each side panel extends rearwardly from the tractor cab, and is captured within a formed pocket structure on the side of the trailer. The formed pocket structures guide the side panels in sliding engagement with the side of the trailer to allow fore and aft movement of the side panel as the cab moves relative to the trailer when making a turn. The pocket structures provide additional upright and lateral support for the side panels to assure their stability and retention in proper position. The side panels are easily attachable and detachable, and may be stored within the pocket structure on the trailer when detached from the tractor cab.

The side panel and pocket structure assemblies may be combined with a roof-mounted fairing attached to the roof of the tractor to further improve aerodynamic airflow of the tractor-trailer unit.

Applicant's invention provides a durable side panel and pocket structure capable of rigorous use for improving airflow around a tractor-trailer truck. It is easy to assemble and install and is of a simple and inexpensive construction. The side panels are adaptable to a wide variety of tractor and trailer types and may be easily interchanged for universal application without special sizing or fitting.

The pocket structures may be permanently attached to the outer surface of the trailer by standard fastening techniques or may be integrally formed within the side wall of the semi-trailer for improved utility and appearance. A universal embodiment is also provided which is removably attached to the trailer for easy disassembly by a clamp-type attachment means. This is advantageous for the independent tractor owner who does not own the trailer which he tows.

DESCRIPTION OF THE DRAWINGS

FIG. 1 is a top, front perspective view of a tractor and semi-trailer truck having aerodynamic side panels and a roof fairing installed;

FIG. 2 is a top plan view of a tractor and semi-trailer positioned to maneuver a turn, showing bending deflection of the aerodynamic side panels;

FIG. 3 is an enlarged, perspective view of an aerodynamic side panel and a pocket structure with a cutaway exposing a guide track for supporting the side panel;

FIG. 4 is a section view of a side panel supported within a pocket structure, taken along line 4—4 of FIG. 3;

FIG. 5 is a section view showing attachment of a side curtain to the side of a tractor cab, taken along line 5—5 of FIG. 3;

FIG. 10 is an enlarged, perspective view of a universal-type pocket structure mounted to the side of a trailer which is capturing a side panel;

FIG. 11 is a section view of a universal pocket structure, taken along line 10—10 of FIG. 10;

FIG. 16 is an enlarged broken away perspective view of an upright plate mounted to blank a space above a fuel tank;

FIG. 17 is a broken away perspective view of an adjustable support plate for mounting a side panel when used with a long wheel-base tractor;

FIG. 18 is an enlarged broken away perspective view of an adaptor support plate for mounting a side panel with an exhaust stack.

DETAILED DESCRIPTION OF THE INVENTION

Figure 7:
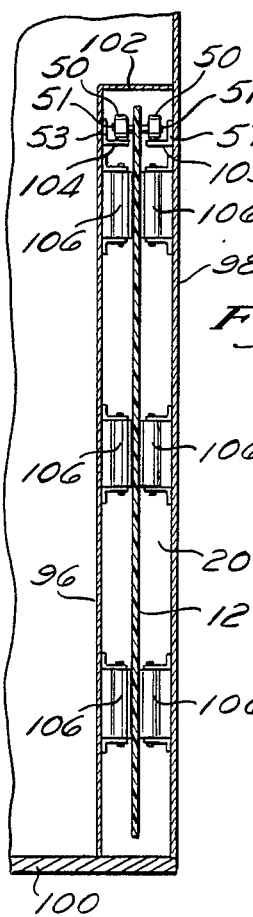
FIG. 7 is a section view of an integral pocket structure formed in the side wall of a semi-trailer, taken along line 7—7 of FIG. 6.
Figure 6:
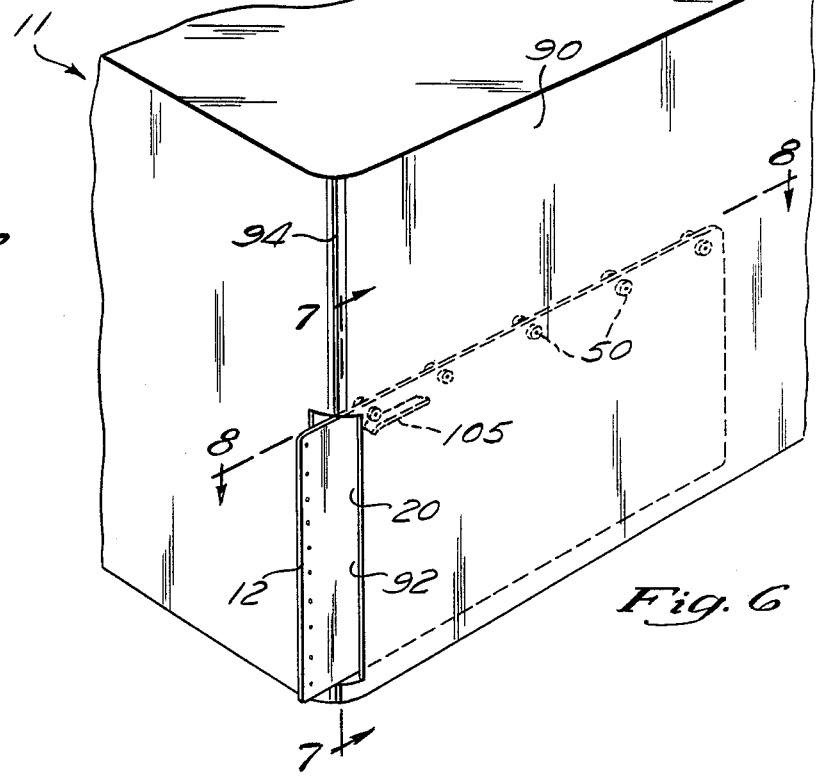
FIG. 6 is an enlarged broken away perspective view of an integral pocket structure formed in the side wall of a semi-trailer.

A preferred embodiment of an aerodynamic side panel and pocket structure assembly for a tractor-trailer truck is shown, as installed, in FIG. 1. A tractor 10 is shown mounting a trailer 11, as is typical for tractor-trailer trucks. A side panel 12 is attached to the side 14 of the tractor cab 16, and extends rearwardly, to provide a smooth transition surface between the tractor cab 16 and the trailer 11, partially enclosing the void space 18 between the rear of the tractor cab 16 and the front of the trailer 12. A rearward portion of the side panel 12 is received in a pocket structure 20 mounted to a sidewall 22 of the trailer 11. The side panel 12 is guided within the pocket structure 20 which restrains different portions of the length of the side panel 12 parallel to the trailer 11 when the cab 16 articulates with the trailer 11 as the truck maneuvers a corner. The side panels 12 are fabricated from a resilient semi-rigid material, such as vinyl, so that they will be able to bend when the tractor pivots relative to the trailer while having a high degree of integral support to allow them to be mounted at one end and support themselves, in an upright orientation, without substantial roll over or deflection. The rigidity of a side panel resists bending deflection, such as is caused by a wind flow against it, and limits the curvature into which a side panel may bend. Deflection resistance limits inward and outward movement of a side panel 12 in the area of the void space 18 to maintain a smooth transition surface.

The movement of a pair of said panels 12a and 12b, mounted to opposing sides of a tractor cab 16, within their corresponding pocket structures 12a and 12b during a turning maneuver of the truck is clearly illustrated in FIG. 2. The tractor 10 is shown pivoted to the left of the trailer 11 as positioned in a left-hand turn of the truck. The right-hand side panel 12a has slidably extended from the right-hand sidewall 24 of the trailer 11, moving the rearward portion of the side panel 12a captured within the right-hand pocket structure 20a forward in the pocket structure, though not exiting its forward opening. The side panel 12a has curved inwardly toward the central axis of the trailer 11 to form a smooth curvilinear profile along the right-hand side of the tractor-trailer truck. The left-hand side panel 12b has slidably receded within the left-hand pocket structure 20b, with the rearward portion of the side panel 12b moving rearwardly along the left-hand side wall 26 of the trailer 11. The left-hand side panel 12b bends in an outwardly direction away from the trailer axis maintaining a smooth transition surface between the rear of the cab 16 and the side 26 of the trailer 11 on the left-hand side.

As the truck proceeds through a corner and begins to straighten, the right-hand side panel 12a will slidably regress within the right-hand pocket structure 20a and decrease in curvature until the side panel 12a has straightened becoming parallel with the trailer side wall 24. The left-hand side panel 12b will slidably extend from the left-hand pocket structure 20b and similarly decrease in curvature until it straightens and becomes parallel with the left trailer wall 26.

Correspondingly similar and opposing movement of the left and right side panels 12a and 12b occurs as the tractor 10 pivots to the right relative to the trailer 11 when the truck proceeds in a right-hand turn.

To further provide aerodynamic improvement, a roof-mounted fairing 40, shown in FIGS. 1 and 2, may be mounted to the roof 42 of the tractor cab 16 to assist directing airflow upwardly and over the roof 44 of the trailer 11. The roof fairing 40 assures that air will not flow against an upper portion of the forward face of the trailer 11, and resists entry of airflow into the void space 18 between the tractor cab 16 and the trailer 11.

A detailed description of the side panel and pocket structure can best be understood with reference to FIGS. 3 and 4. The side panel 12 is provided with a plurality of support rollers 50 mounted adjacent to an upward edge 56 of the side panel 12 and extending laterally therefrom. The mounting rollers 50 are spaced along the length of the side panels 12 to provide upright support for the panel when the rollers are engaged with guides within the pocket structure 20, while permitting fore and aft sliding movement of the side panel 12.

The pocket structure 20 is fastened to a trailer side wall 56. The pocket structure 20 comprises a top mounting bracket 58 which is horizontally fastened along an upper portion of the trailer side wall 56 and a bottom mounting bracket 59 which is horizontally mounted along a lower portion of the trailer side wall 56. The mounting brackets 58, 59 extend outwardly from the trailer side wall 56 to support and space an outer wall 60 from the trailer side wall 56, forming an enclosure in which the side panel 12 is captured. The mounting brackets are fastened to the trailer side wall by suitable fastening means as are typically used for such applications.

A pair of parallel and spaced guide tracks 54 and 55 extend horizontally within the pocket structure 20 to receive the support rollers 50 of the side panel 12. The rollers 50 of the side panel 12 engage the guide tracks 54 and 55, and roll along their horizontal support surfaces 61 and 62, respectively, to provide upright support of the side panel 12 while permitting fore and aft sliding movement. Lateral support is also provided to the side panel 12 by the support rollers 50. The ends 51 of the support rollers 50 engage side support surfaces 53 and 57 of the inner and outer guide tracks 54 and 55, respec- The side panels 12 are fastened to a rearward portion of the side 80 of the tractor cab 16, as shown in FIGS. 3 and 5. Fastening is accomplished by a plurality of mounting studs 82 protruding from the side 80 of the tractor cab 16 and spaced in vertical arrangement. Grommets 84 positioned through a forward portion of the side panel 12 in mating vertical arrangement, are positioned over the mounting studs 82. Wing nuts 86 are then tightened on the mounting studs 82 to secure the side panel 12 to the cab 16. A leading edge deflector 88 is mounted to the tractor cab 16 immediately proceeding the mounting studs 82 to guard the forward edge of the side panel 12 and to prohibit air from entering between the side panel 12 and the side 80 of the cab 16 when the truck is moving. The leading edge deflectors are attached to the cab 16 by suitable fasteners.

Figure 8:
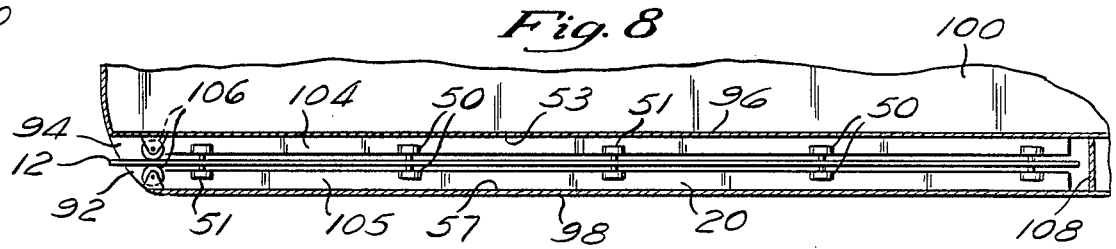
FIG. 8 is a section view of inner and outer guide tracks and support rollers of an integral pocket structure, taken along line 8—8 of FIG. 6.
Figure 9:
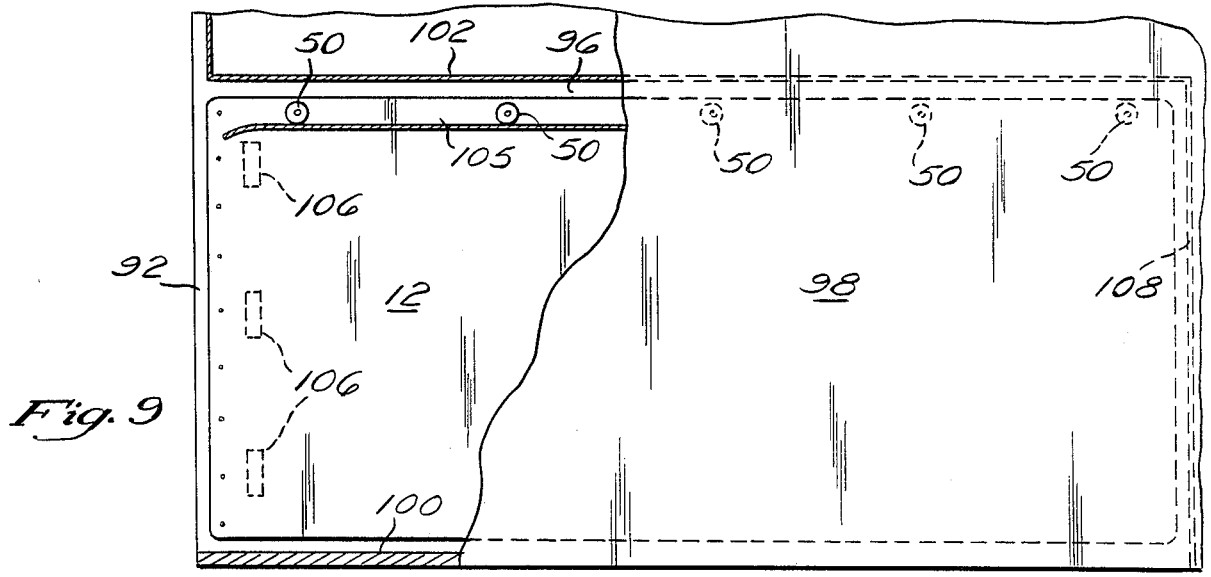
FIG. 9 is a side broken away elevation view showing a side panel mounted in storage position within an integral pocket structure of a semi-trailer.

An alternative embodiment of a pocket structure 20 is shown in FIGS. 6 through 9. A pocket structure 20 may be integrally formed within the trailer side wall 90. An entry opening 92 is formed at a forward corner 94 of the trailer 11 permitting entry of the side panel 12 within the trailer wall 90. An inner wall 96 is formed within the cargo carrying space of the trailer 11, and spaced from the trailer outer wall 98 along the floor 100 of the trailer, and by a horizontally positioned lateral brace 102 at its upper end. Inner and outer guide tracks 104, 105 are horizontally positioned within the enclosure of the pocket structure 20 to receive support rollers 50 of a side panel 12, permitting fore and aft sliding movement of the side panel while providing upright support, as can be seen in FIGS. 7 and 8. Lateral support is also provided to the side panel 12 by the support rollers 50. The ends 51 of the support rollers 50 engage side support surfaces 53 and 57 of the inner and outer guide tracks 104 and 105, respectively, to align the side panel 12 within the pocket structure 20. A plurality of lateral support rollers 106, shown in FIGS. 7 through 9, are positioned adjacent to the entry opening 92 of the pocket structure 20, and spaced vertically, to assist in providing lateral support to the side panel 12 as it bends when the truck proceeds through a corner.

The inner guide track 104 is fastened to the inner wall 96 of the pocket structure 20 by suitable fasteners. The in their upward end. The mounting rods 118 extend upwardly from the tubular frame members 114 and have a substantially U-shaped portion 120 formed at their uppermost ends. The U-shaped portion 120 is directed inwardly over the rod 115 of the trailer 11. A downwardly facing end 122 of the U-shaped portion 120 of the rod 118 is provided with a suction-type attachment disc 124 for engagement with the top 126 of the trailer 11 to attach the mounting rods 118 securely to the trailer.

A winged set screw 130 extends through the wall of each tubular frame member 114 to apply locking force between the tubular frame member 114 and the mounting rod 118, thereby constraining sliding movement of the mounting rod 118 within the tubular frame member 114 when the framework 110 is mounted in position on the trailer 11.

A bracket 132 extends inwardly from the lower end of the tubular frame member 114 beneath the floor 134 of the trailer 11. The bracket 132 is provided with a set screw 136 which is fitted through an inward portion 138 of the bracket 132 in vertical alignment with the disc 124 for adjustably applying clamping force to the trailer 11 between the set screw 136 and the disc 124.

Thus, it can be seen, when installing the universal pocket structure, the extendable mounting rods 118 can be slidably positioned within the upright tubular frame members 114 to adjust the size of the universal pocket structure to the heighth of a trailer 11 on which it will be installed. The winged set screws 130 in the tubular frame members 114 are then tightened to secure the position of the mounting rods 118 within the tubular frame members 114. The universal pocket structure is then positioned on the trailer over the side panel 12 extending rearwardly from the tractor cab, with the suction discs 124 engaging the roof 115 of the trailer 11. The set screws 136 are then tightened, applying clamping force to the trailer 11 to hold the universal pocket structure in position on the side of the trailer. The universal pocket structure is positioned to hold the rail-guide framework 110 in space relation from the trailer side wall 111 to capture a side panel 12 between the rail-guide framework 110 and the trailer side wall 111.

Figure 12:
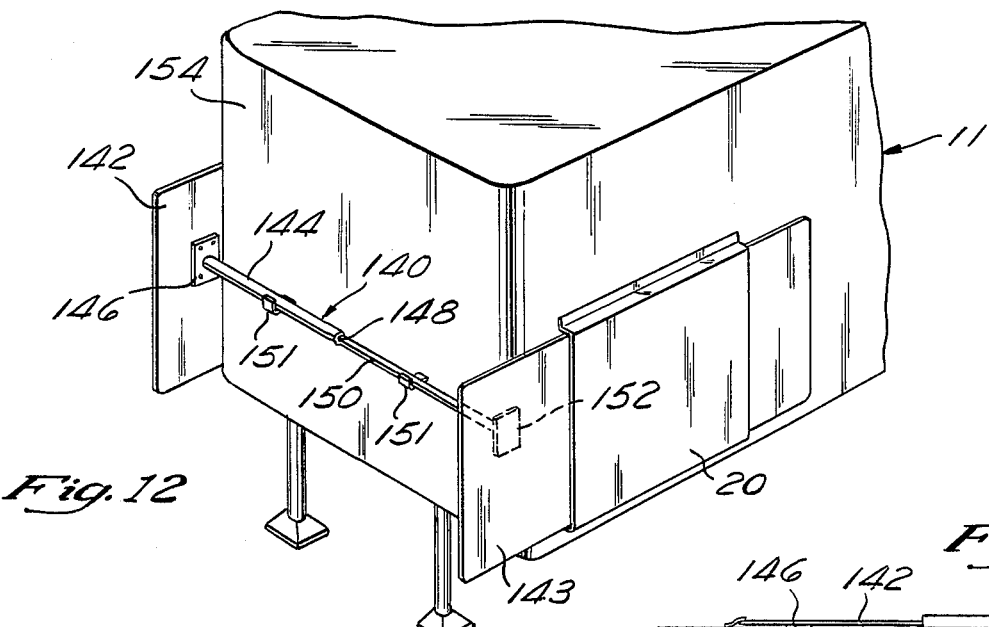
FIG. 12 is an enlarged, perspective view showing a lateral support mounted between a pair of opposing side panels positioned for storage.
Figure 13:
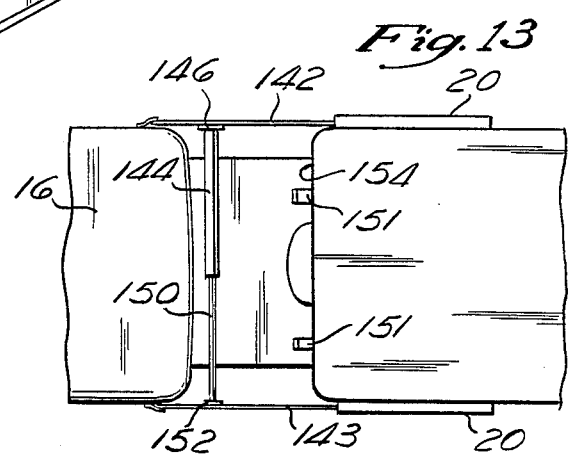
FIG. 13 is a top plan view showing a lateral support positioned between a pair of opposing side panels when installed to the sides of a tractor cab.

Referring to FIGS. 12 and 13, a lateral support 140 can be provided to interconnect right and left-hand side panels 142, 143 to prevent flutter of the side panels and to resist inward or outward deformation of the side panels from airflow when the truck is proceeding along the highway. The lateral support 140 comprises a first tubular member 144 having a base plate 146 at an outward end. The base plate 146 is attached to the side panel 142 a proper distance from the forward edge of the side panel by suitable fasteners. The first tubular member 144 provides a tubular opening 148 for receiving a second tubular member 150 in threaded engagement or in sliding engagement with suitable locking means. The second tubular member 150 similarly has a base plate 152 attached in like relation to the opposing side panel 143. Adjustment is made between mating first and second tubular members 144 and 150 to provide the desired lateral support to the right and left side panels 142, 143.

Advantageously, hooks 151 may be provided on the front 154 of the trailer 11 to hold the lateral support 140 and the side panels 142, 143 for storage when the trailer is disconnected from the tractor.

Figure 14:
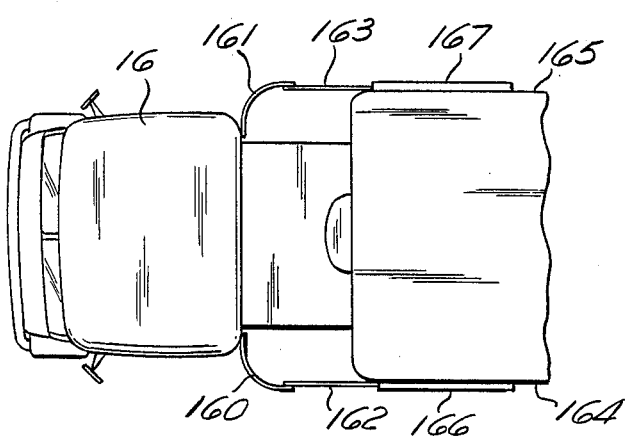
FIG. 14 is a top plan view depicting a pair of extended side fairings mounting a pair of opposing side panels to a narrow tractor cab.
Figure 15:
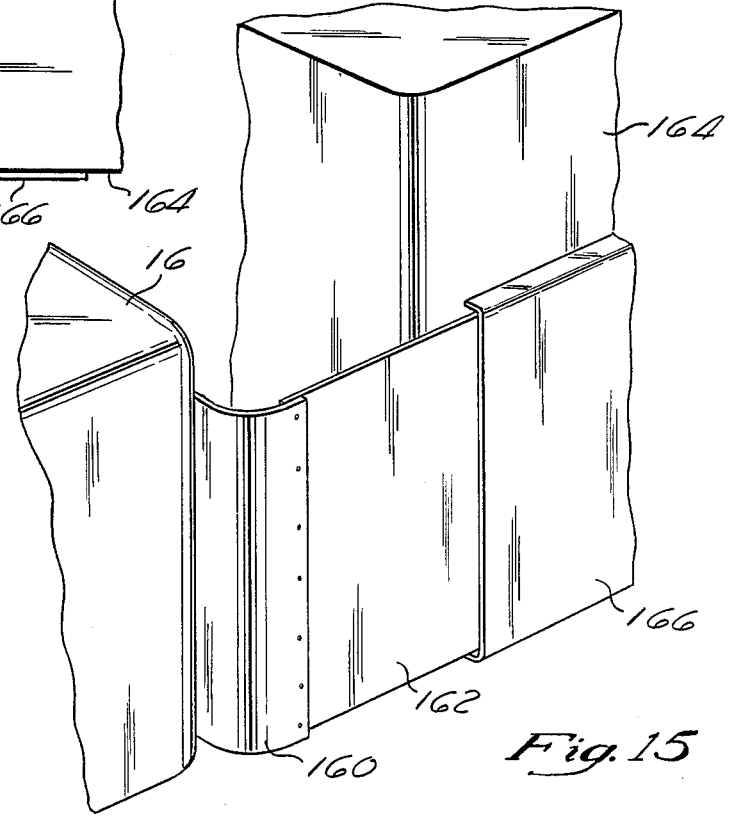
FIG. 15 is an enlarged broken away perspective view of an extended side fairing mounting a side panel as is used with a tractor cab which is narrower than a semi-trailer.

For situations in which the width of a tractor cab 16 is smaller than the width of a trailer which the tractor will tow, extended side fairings 160, 161 are provided, as shown in FIGS. 14 and 15, for attachment to the rear of the tractor cab 16. The extended side fairings 160, 161 have a curved shape and extend outwardly from the tractor cab 16 to mount the side panels 162, 163 in parallel relation with the side walls 164, 165 of a trailer 11 for proper sliding engagement within the pocket structures 166, 167. The extended side fairings 160, 161 may be used with any of the three embodiments of a pocket structure heretofore described.

Referring to FIG. 16, tractors which have side hung fuel tanks 170 may have an opening 172 between the tractor cab 16 and the trailer 11, and below the bottom edge 174 of the side panel 175 and the top of the fuel tank 170 when the side panels are installed. To enclose such opening 172, an upright fuel tank plate 176 is provided which extends vertically from the upper surface of the fuel tank 170 and parallel to the side panel 175 to provide a continuous smooth transition surface between the tractor cab 16 and a trailer side wall 178. The plate 176 is mounted to the fuel tank 170 by L-shaped brackets 180 which attach between the fuel tank 170 and the support straps 182 which mount the fuel tank 170 to the tractor 10. Since the upright plate 176 is attached to and moves with the tractor cab 16, interference between the upright plate 176 and the side panel 175 does not occur when the tractor-trailer truck maneuvers in a turn. The upright plate 176 maintains a spaced relation with the forward edge 184 of the side panel 175 mounted to the side of the tractor cab 16.

To provide for adjustment of a side panel structure for application to both large and small wheel-based tractors, referring to FIG. 17, an adjustable support plate 194 is provided which allows fore and aft sliding adjustment of the side plate 12 to properly position the side plate 12 within a pocket structure 20. A fixed side plate 192 is mounted to the rearward side of the tractor cab 16 and extended rearwardly. An adjustable support plate 194 is slidably mated with the fixed side plate 192 for adjustment. A plurality of longitudinal slots 196 are formed in the adjustable support plate 194 through which a bolt 198 and wing nut 199 are positioned to fasten the adjustable support plate 194 to the fixed side plate 192. A side plate 12 extends rearwardly from the adjustable support plate 194, which is identical in configuration and structure as those previously described. The side plate 12 is captured in a pocket structure 20 carried on the trailer 11. For adjustment, the wing nuts 199 may be loosened and the adjustable support plate 194 slidably positioned to allow the proper length of side plate 12 to reside within the pocket structure 20. The wing nuts 199 are then tightened securely clamping the adjustable support plate 194 to the fixed support plate 192 thereby properly positioning the side plate 12 for the wheel base of the tractor 10.

The side plate and pocket structure assembly may be adapted to a tractor which has an exhaust stack 200 positioned adjacent to the corner 202 of a tractor cab 16 by use of an exhaust adaptor plate 204, shown in FIG. 18. The exhaust adaptor plate has a generally U-shaped configuration to extend around the exhaust stack 200 with a planar portion 205 extending rearwardly. One leg 206 of the U configuration is attached to the rear of the tractor cab 16 for mounting.

The exhaust adaptor plate 204 is mounted with the rearwardly extending planar portion 205 aligned with the side 207 of the tractor cab. A side panel 12 is attached to the planar portion of the exhaust adaptor plate 204 in standard fashion. It should be noted, however, that in situations where the cab width is less than that of the trailer, the extended side fairings as described in FIGS. 10 and 11 may be used in response to this problem.

What is claimed is:

1. A device for improving airflow around a tractor-trailer truck comprising:
   a pair of side panels on opposite sides of said tractor and trailer for providing a smooth side transition surface between said tractor and trailer;
   means for mounting one end of each of said side panels to said tractor; and
   guide means mounted on each side of said trailer for restraining different portions of the length of each of said side panels to simultaneously lie in planes parallel to the sides of said trailer as said tractor-trailer truck articulates, said guide means including roller support means for vertically supporting said different portions of each of said side panels.

2. A device for improving airflow around a tractor-trailer truck comprising:
   a side panel for providing a smooth side transition surface between said tractor and said trailer;
   means for mounting one end of said panel to said tractor; and
   guide means mounted on the side of said trailer for restraining different portions of the length of said side panel to lie in a plane parallel to the side of said trailer as said tractor-trailer truck articulates wherein said guide means includes roller support means for horizontally supporting said different portions of said side panel.

3. A device for improving airflow around a tractor-trailer truck comprising:
   a pair of side panels on opposite sides of said tractor and trailer for providing a smooth side transition surface between said tractor and trailer;
   means for mounting one end of each of said side panels to said tractor;
   guide means mounted on each side of said trailer for restraining different portions of the length of each of said side panels to simultaneously lie in planes parallel to the sides of said trailer as said tractor-trailer truck articulates; and
   lateral support means for interconnecting and spacing said opposing pair of side panels across the void between said tractor and said trailer, said support means maintaining a substantially fixed relation between a central portion of said opposing side panels.

* * * * *